United States Patent [19]

Yokev et al.

[11] Patent Number: 5,530,452
[45] Date of Patent: Jun. 25, 1996

[54] METHOD OF SYNCHRONIZING SPREAD SPECTRUM RADIO TRANSMITTERS

[75] Inventors: Hanoch Yokev, Ramat Gan; Haim Harel, Herzliya, both of Israel

[73] Assignee: Nexus Telecommunication Systems Ltd., Givatayim, Israel

[21] Appl. No.: 363,289

[22] Filed: Dec. 22, 1994

Related U.S. Application Data

[62] Division of Ser. No. 140,716, Oct. 2, 1993, Pat. No. 5,379,047.

[51] Int. Cl.⁶ ............................................. G01S 3/02
[52] U.S. Cl. ................................................ 342/457
[58] Field of Search ................................ 375/356, 358, 375/211; 342/457

[56] References Cited

U.S. PATENT DOCUMENTS

| | | | |
|---|---|---|---|
| Re. 32,365 | 3/1987 | Sebestyen | 340/311.1 |
| 3,972,042 | 7/1976 | Johnson | 343/17.2 |
| 4,053,889 | 10/1977 | Johnson | 343/17.2 |
| 4,114,155 | 9/1978 | Raab | 343/105 R |
| 4,152,702 | 5/1979 | Piesinger | 343/111 SA |
| 4,156,877 | 5/1979 | Piesinger | 343/100 SA |
| 4,188,629 | 2/1980 | Johnson | 343/6.5 R |
| 4,193,030 | 3/1980 | Rabow et al. | 375/2 |
| 4,229,741 | 10/1980 | Groth, Jr. | 370/24 |
| 4,447,907 | 5/1984 | Bjornholt et al. | 375/1 |
| 4,479,227 | 10/1984 | Bjornholt | 375/1 |
| 4,494,238 | 1/1985 | Groth, Jr. | 375/1 |
| 4,532,635 | 7/1985 | Mangulis . | |
| 4,554,668 | 11/1985 | Deman et al. . | |
| 4,611,333 | 9/1986 | McCallister et al. | 375/1 |
| 4,617,674 | 10/1986 | Mangulis et al. . | |
| 4,644,351 | 2/1987 | Zabarsky et al. | 340/825.44 |
| 4,694,466 | 9/1987 | Kadin | 375/1 |
| 4,701,934 | 10/1987 | Jasper | 375/1 |
| 4,728,959 | 3/1988 | Maloney et al. | 342/457 |
| 4,740,792 | 4/1988 | Sagey et al. | 342/457 |
| 4,750,036 | 6/1988 | Martinez | 358/147 |
| 4,785,463 | 11/1988 | Janc et al. | 375/1 |
| 4,811,379 | 3/1989 | Grandfield | 379/57 |
| 4,823,123 | 4/1989 | Siwiak | 340/825.44 |
| 4,825,193 | 4/1989 | Siwiak et al. | 340/311.1 |
| 4,868,560 | 9/1989 | Oliwa et al. | 340/825.44 |
| 4,875,038 | 10/1989 | Siwiak et al. | 340/825.44 |
| 4,882,579 | 11/1989 | Siwiak | 340/825.44 |
| 4,891,637 | 1/1990 | Siwiak et al. | 340/825.44 |
| 4,928,177 | 5/1990 | Martinez | 358/142 |
| 5,017,926 | 5/1991 | Ames et al. | 342/353 |
| 5,063,560 | 11/1991 | Yerbury et al. | 370/18 |
| 5,073,899 | 12/1991 | Collier et al. | 375/1 |
| 5,099,245 | 3/1992 | Sagey | 342/357 |
| 5,103,459 | 4/1992 | Gilhousen et al. | 375/1 |
| 5,105,435 | 4/1992 | Stilwell | 375/1 |
| 5,111,478 | 5/1992 | McDonald | 375/1 |
| 5,142,279 | 8/1992 | Jasinski et al. | 340/825.44 |
| 5,144,668 | 9/1992 | Malek et al. | 380/48 |

(List continued on next page.)

FOREIGN PATENT DOCUMENTS

| | | |
|---|---|---|
| 484918A2 | 5/1992 | European Pat. Off. . |
| WO92/03558 | 3/1992 | WIPO . |
| WO92/04796 | 3/1992 | WIPO . |
| WO92/11722 | 7/1992 | WIPO . |
| WO92/12601 | 7/1992 | WIPO . |
| WO92/17011 | 10/1992 | WIPO . |
| WO92/17012 | 10/1992 | WIPO . |
| WO93/03558 | 2/1993 | WIPO . |

*Primary Examiner*—Theodore M. Blum
*Attorney, Agent, or Firm*—Schwegman, Lundberg, Woessner & Kluth

[57] ABSTRACT

Position determining apparatus including at least one base transmitter/receiver (BTR) station including a base transmitter which periodically transmits timing signals and a plurality of mobile transmitter/receivers (MTR). Each MTR includes a mobile receiver operative to receive timing signals transmitted by at least one base transmitter; synchronization circuitry receiving the timing signals and providing a spread-spectrum frequency-hopping sequence characteristic of the particular MTR; and a mobile transmitter producing a radiated frequency hopped signal responsive to the frequency-hopping sequence and the timing signal.

5 Claims, 4 Drawing Sheets

U.S. PATENT DOCUMENTS

| | | | |
|---|---|---|---|
| 5,148,452 | 9/1992 | Kennedy et al. | 375/96 |
| 5,153,582 | 10/1992 | Davis | 340/825.44 |
| 5,191,593 | 3/1993 | McDonald et al. | 375/1 |
| 5,193,101 | 3/1993 | McDonald et al. | 375/1 |
| 5,193,102 | 3/1993 | Meidan et al. | 375/1 |
| 5,204,876 | 4/1993 | Bruckert et al. | 375/1 |
| 5,210,771 | 5/1993 | Schaeffer et al. | 375/1 |
| 5,335,246 | 8/1994 | Yokev et al. | 375/1 |
| 5,379,047 | 1/1995 | Yokev et al. | 342/457 |
| 5,430,759 | 7/1995 | Yokev et al. | 375/202 |

METHOD OF SYNCHRONIZING SPREAD SPECTRUM RADIO TRANSMITTERS

This is a division of application Ser. No. 08/140,716, filed Oct. 21, 1993 now U.S. Pat. No. 5,379,042.

FIELD OF THE INVENTION

This invention relates to the field of position determination of remote objects and in particular to the location of large numbers of position location transmitters.

BACKGROUND OF THE INVENTION

Position location systems are well known. In particular, systems for the location of ships based on triangulation of fixed or moving transmitters by the ship are well known. Furthermore, it is known to transmit a signal from a movable object and to find the position of the object by triangulation from fixed receivers or from a single moving receiver.

In the TRANSIT system, six polar transit satellites, whose instantaneous position is well known, transmit a fixed tone. A receiver on a ship receives this signal and determines both the time at which the Doppler shift gradient is a maximum and the magnitude of the Doppler shift. From the time of shift and the known position of the satellite at that time, the latitude is determined. From the magnitude of the shift, the longitude can be determined.

In a variant of the TRANSIT system, called WARK, the ground based object, such as a ship, transmits the signal which is received, with its Doppler shift, to the satellite. The satellite rebroadcasts the signal to a ground station which computes the object's position and transmits it to the object.

Automatic personal locators (APL) and Automatic Vehicle Locators (AVL) are also known in the art. In general these devices are relatively large and transmit substantial power or are small and have a limited range. If the system is small, attempts to increase its range will result in its batteries being consumed too quickly for the system to be practical.

Spread spectrum techniques and, in particular, frequency hopping techniques for communication are also well known. See for example, *Digital Communications* by, John. G. Proakis, McGraw Hill, New York pp. 845–860. In general these systems have a bandwidth of several kilohertz, which is suitable for information transmission. In view of this requirement, such devices have either a large size or short range or both.

The use of a wide band receiver for the reception of narrow band frequency hopped signals is known in the art. In such systems, signals are received from one or more sources by a wide band receiver and the signals are processed by a fast Fourier transform to provide signals in the frequency domain. A computer divides this spectrum into relatively narrow preset communication channels, which correspond to the channels which are used by the transmitting stations. When a plurality of transmitting stations are used, the system is capable of separating between them and can thus receive more than one message, although the problem of de-interleaving of the signals becomes difficult when large numbers of potential or actual transmitters are involved.

Location systems for vehicles based on GPS or Loran-C are also known. In these systems a mobile receiver receives the GPS or Loran-C signals, determines its own position and broadcasts this position to a central station.

SUMMARY OF THE INVENTION

None of these methods fully solves the problem of determining the position of large numbers of mobile stations over a large area. In such systems the amount of information which must be transferred by the mobile stations is low, however, for APL systems, the power requirements must be very low and for AVL systems the number of systems which broadcast simultaneously can be very large. In either event it is advisable to keep the power level low, if possible within the 1 watt power level allowed by FCC Regulation 15–247, which is incorporated herein by reference.

In general, such locating systems have large numbers of mobile units which are only sporadically activated.

For example, a commercial APL may be used for location of people in emergency health or other situations. The transmitters, which ideally should work anywhere in a large city, would be activated only when help is needed. In this situation the system would be required to determine the identity of the person and his location. AVL systems could be used for locating stolen cars and could be activated remotely. They could also be used to keep track of the location of units of a large fleet of vehicles spread over a very large area.

In the present invention, the location system operates in a spread spectrum mode using frequency hopping in order to provide maximum range and minimum power. The base system(s) comprises a very wide band receiver whose output signal is Fourier transformed and segmented into a very large number of narrow frequency channels. Due to the fact that the information content of the transmitted signals contains little information, these channels can be very narrow and can thus accommodate a large number of users. The narrowness of the channels results in a very low noise for the system and thus a large range, with low power for the moving stations.

In a preferred embodiment of the invention, synchronization signals are transmitted periodically from a central location and are received by the mobile locators when they are active. These periodic signals define a synchronizing time to the moving stations and, preferably, an internal memory therein determines the correct frequencies for the frequency hopping transmission, so that they, transmit at the correct frequencies at the correct times.

The receivers, which use only information regarding the existence, or more accurately, of the activation of a MTR have a greatly reduced de-interleaving problem, since the receivers in the base station will be able to identify each of the transmitters from its initial frequency or after a very few frequency hops.

It is not necessary that radiators have very high frequency stability. In a preferred embodiment of the invention, ordinary crystal-controlled transmitters having an accuracy of one part in 100,000 ($\approx$10 kHz) are sufficient, even though the frequency channels are made much narrower (of the order of 50 Hz or less) in order to allow for identification at large distances. The total band-width of the system is preferably of the order of 1.5 Mhz, which means that there are about 30 thousand available channels. However, to assure that there is minimal cross-talk or interference between adjacent transmitters or between different adjoining frequencies of the same transmitter (as described below), only about 3000 of these available channels are used. Broader or narrower total system bandwidth could also be used depending on the requirements of the particular application. Since only several transmitters will be broadcasting at a particular time at or near the same frequency, one, or at most a few, frequency hops will be sufficient to determine which MTR is transmitting, since the system need only search for a limited number of possible frequencies and combinations. The deviation of the transmitter can then be determined. All subsequent received signals are corrected for the same, or a proportional, deviation.

In order to further aid in identification of the station and the rejection of background noise, the frequency of the transmitter during a particular hop is preferably varied in a predetermined manner ("twiddling") which is recognized by the computer. Such twiddling may include a small repetitive frequency hop of, for example, about 450 Hz, i.e., about 9 channels, during the transmission at a given frequency.

Position detection is preferably performed by using any appropriate method such as triangulation.

Triangulation direction finding is preferred and, in a preferred embodiment of the invention, it is based on an interferometric system. Position locating systems in which the position is determined by the time of arrival of signals requires a wide bandwidth. The present system uses a very narrow bandwidth to increase the number of channels and reduce noise. As is well known, the resolution of position determining systems is inversely proportional to the bandwidth of the system; since the bandwidth of the signals in the present system is very low, the system has essentially no range resolution based on time of arrival. The present system thus preferably uses an interferometric direction finding system which is as accurate as the time of arrival systems, but generally requires either a moving receiver or more than one receiver for locating the transmitter.

By using these techniques, the system accommodates a large number of users and allows for synchronism of the spread spectrum/frequency hopping by the users.

There is, therefore, provided, in a preferred embodiment of the invention, position determining apparatus including at least one base transmitter/receiver (BTR) station including a base transmitter which periodically transmits timing signals and a plurality of mobile transmitter/receivers (MTR). Each MTR includes a mobile receiver operative to receive timing signals transmitted by at least one base transmitter, synchronization circuitry receiving the timing signals and providing a spread spectrum frequency-hopping code characteristic of the particular MTR, and a mobile transmitter producing a radiated frequency-hopped signal responsive to the frequency hopping code and the timing signal.

In a preferred embodiment of the invention, the BTR includes a base receiver which receives the radiated frequency-hopped signal, and signal identification circuitry operative for identifying the mobile transmitter receiver based on the pattern of the received frequency hopped signal.

Preferably, the BTR also includes means for determining direction of the MTR.

In a preferred embodiment of the invention the MTR includes an activation signal operative to activate the mobile transmitter in response to activation signals. In one preferred embodiment of the invention the activation signal is produced by an operator at the MTR. In an alternative preferred embodiment of the invention, the activation signals are transmitted by the BTR and received by the base receiver.

In a preferred embodiment of the invention the MTR also includes a frequency synthesizer which produces a frequency hopped signal utilizing a phase locked loop. The R.F. is generated by a voltage controlled oscillator which is derived from and phase compared to a high Q reference oscillator including a crystal reference. The result is filtered and used for correction of the R.F. frequency.

The smaller frequency jump, which in the preferred embodiment is about 450 Hz, is produced by adding a capacitor to the crystal reference using a back-biased diode.

BRIEF DESCRIPTION OF THE DRAWINGS

The invention will be better understood in conjunction with the following description of the non-limiting preferred embodiments of the invention which are described in conjunction with the drawings in which.

DETAILED DESCRIPTION OF THE PREFERRED EMBODIMENTS

Figure 1:
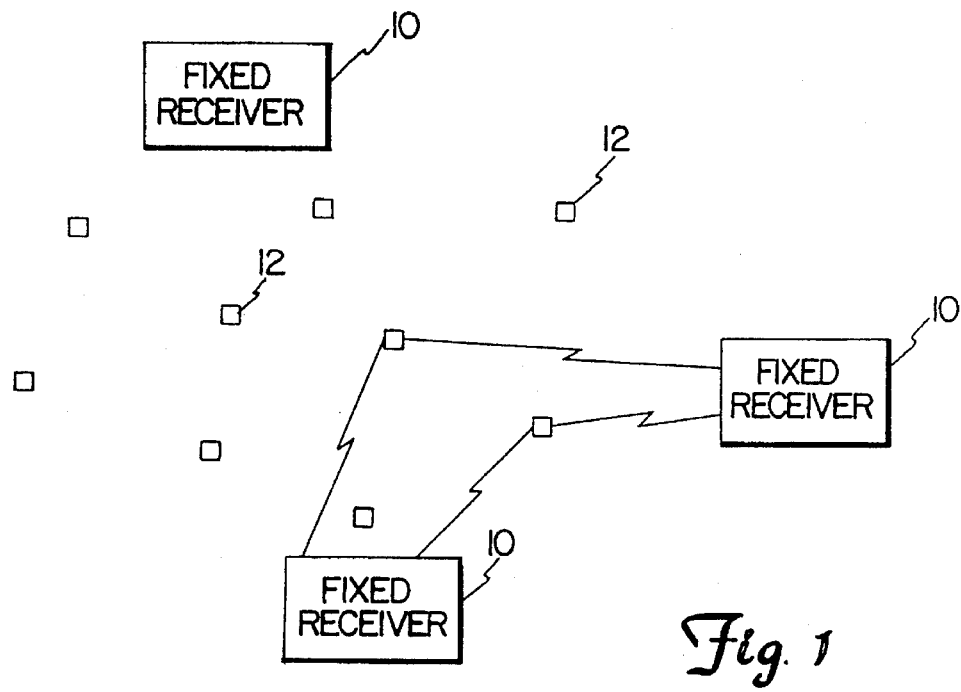
FIG. 1 is a schematic block diagram of a preferred embodiment of a locator system in accordance with a preferred embodiment of the invention.

As shown in FIG. 1, a locator system in accordance with a preferred embodiment of the invention comprises one or more base transmitter/receivers (BTR) 10 and a plurality, generally a large number, of mobile transmitter/receivers (MTR) 12, which can be carried by people or vehicles whose position is to determined. In general, the position of a particular MTR 12 is required only intermittently and the MTR is activated, as described below, only during such periods. The BTRs may be fixed, in which case preferably two or three BTRs are used, or may be carried in a vehicle, for example a tracking vehicle in which case one BTR may be sufficient.

Figure 2:
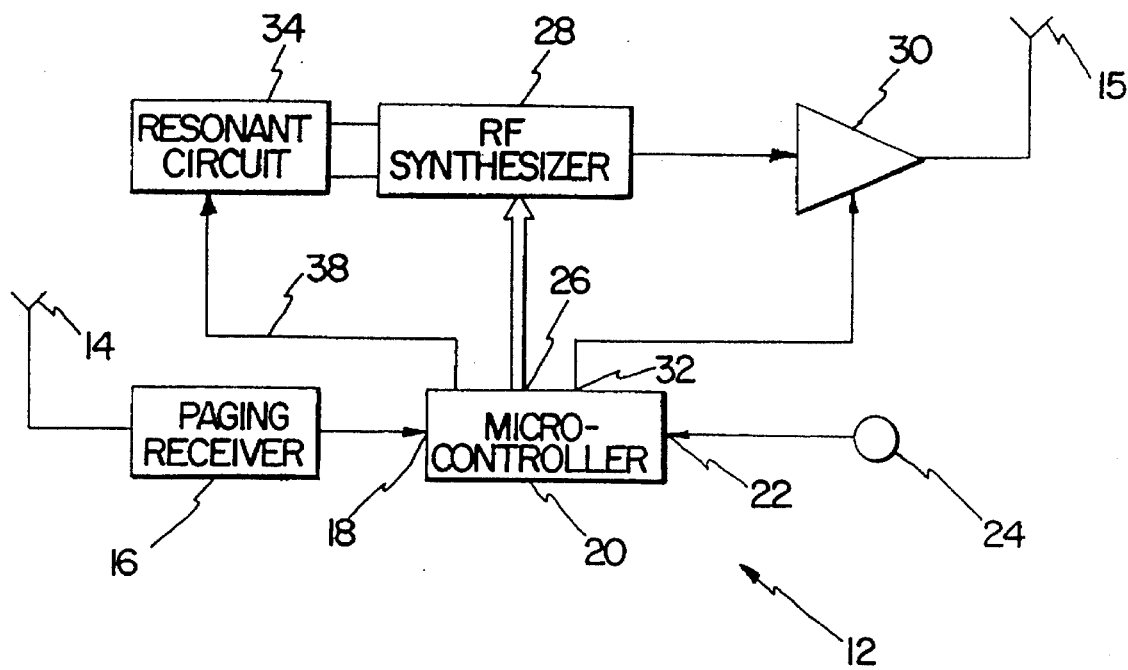
FIG. 2 is a schematic block diagram of a preferred embodiment of a mobile transmitter/receiver unit in accordance with a preferred embodiment of the invention.

FIG. 2 shows the details of an single MTR. MTR 12 comprises an antenna 14, for receiving signals from BTR 10 and an antenna 15 for transmitting signals to the BTRs. Alternatively, the same antenna can be used for both sending and receiving signals from the BTRs. Antenna 14 feeds a paging receiver 16 which sends signals to an input port 18 of a microcontroller 20. Microcontroller 20 receives the signals from the receiver and resets an internal clock (not shown, but generally part of microcontroller 20) based on the time of arrival of the coded signals received by the MTR. Microcontroller 20 also includes at least one lock up table which stores a frequency hopping sequence which is characteristic of the particular MTR. A second input port 22 receives a "transmit" command from a pushbutton 24 which is activated by a user. Alternatively, a transmit command may be received from a BTR via the pager receiver. An output port 26 of microcontroller 20 supplies frequency control signals to an RF synthesizer 28 which drives antenna 15 via an amplifier 30. Amplifier 30 is preferably a C-class amplifier, producing up to 1 watt of power. Amplifier 30 is activated in response to signals received from a second output port 32 of microcontroller 20.

The nature of these signals will be described below.

Preferably, the frequency of transmission of MTR 12 is determined by frequency synthesizer 28. The reference frequency for synthesizer 28 is provided by a crystal controller 34 which is typically a resonant circuit. Crystal controller 34 is attached to the crystal input terminals of RF synthesizer 28, such that the output frequency of the RF synthesizer is the resonant frequency multiplied by a factor derived from the signal at port 26.

Figure 3:
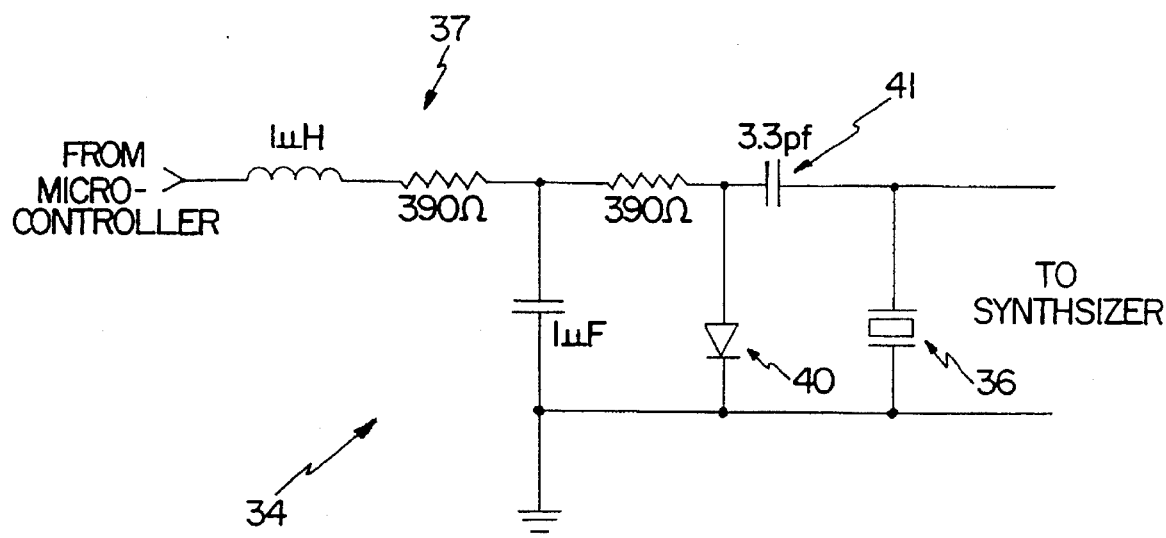
FIG. 3 is a schematic diagram of a crystal controller in accordance with a preferred embodiment of the invention.

A preferred embodiment of crystal controller 34 is shown in FIG. 3. Crystal controller 34 preferably includes a crystal 36, such as a high Q quartz crystal which oscillates at, for example, 9.6 Mhz a switching circuit 37, which is activated from a third output port 38 of microcontroller 20, and a small perturbating capacitance which is connected in parallel to crystal 36 when switching circuit 36 is activated.

In the circuit of FIG. 3, when a diode 40 is back-biased, crystal 36 has the series combination of the diode capacitance and the 3.3 pf capacitance 41 across it. When the diode is forward biased, the capacitance across the crystal is 3.3 pf. The effect of the change of capacitance is to perturbate the effective frequency of the crystal by about one part in 50,000 and thus to twiddle the transmitted frequency by a like percentage.

Figure 4:
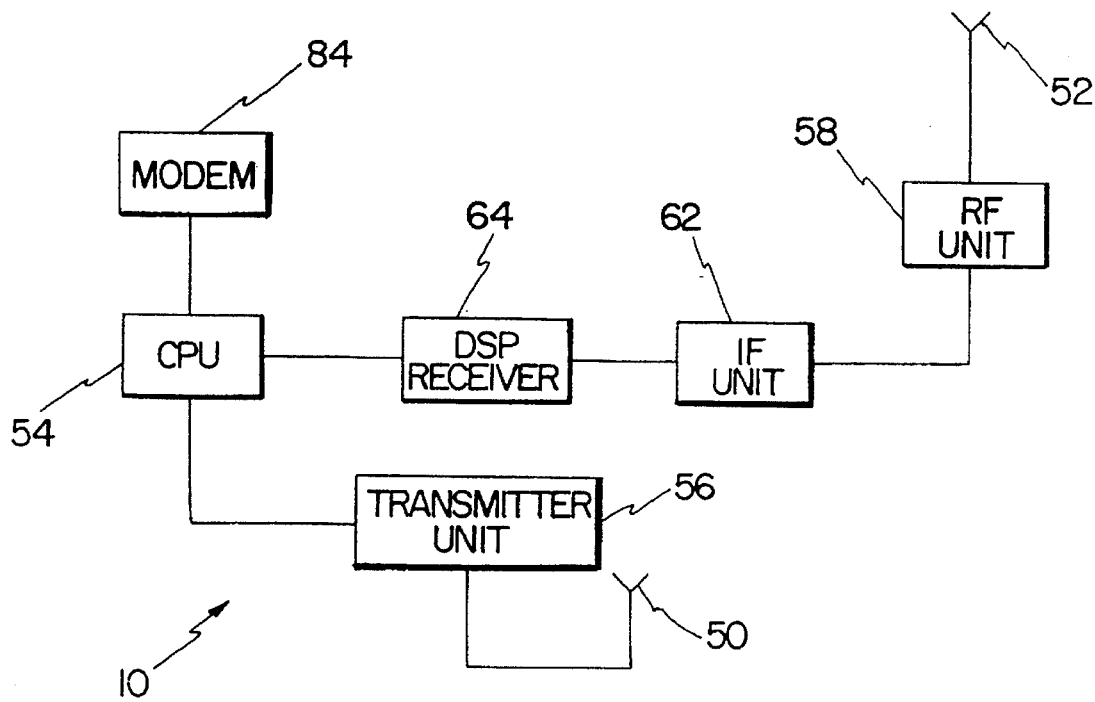
FIG. 4 is a schematic block diagram of a preferred embodiment of a fixed transmitter/receiver unit in accordance with a preferred embodiment of the invention.
Figure 5:
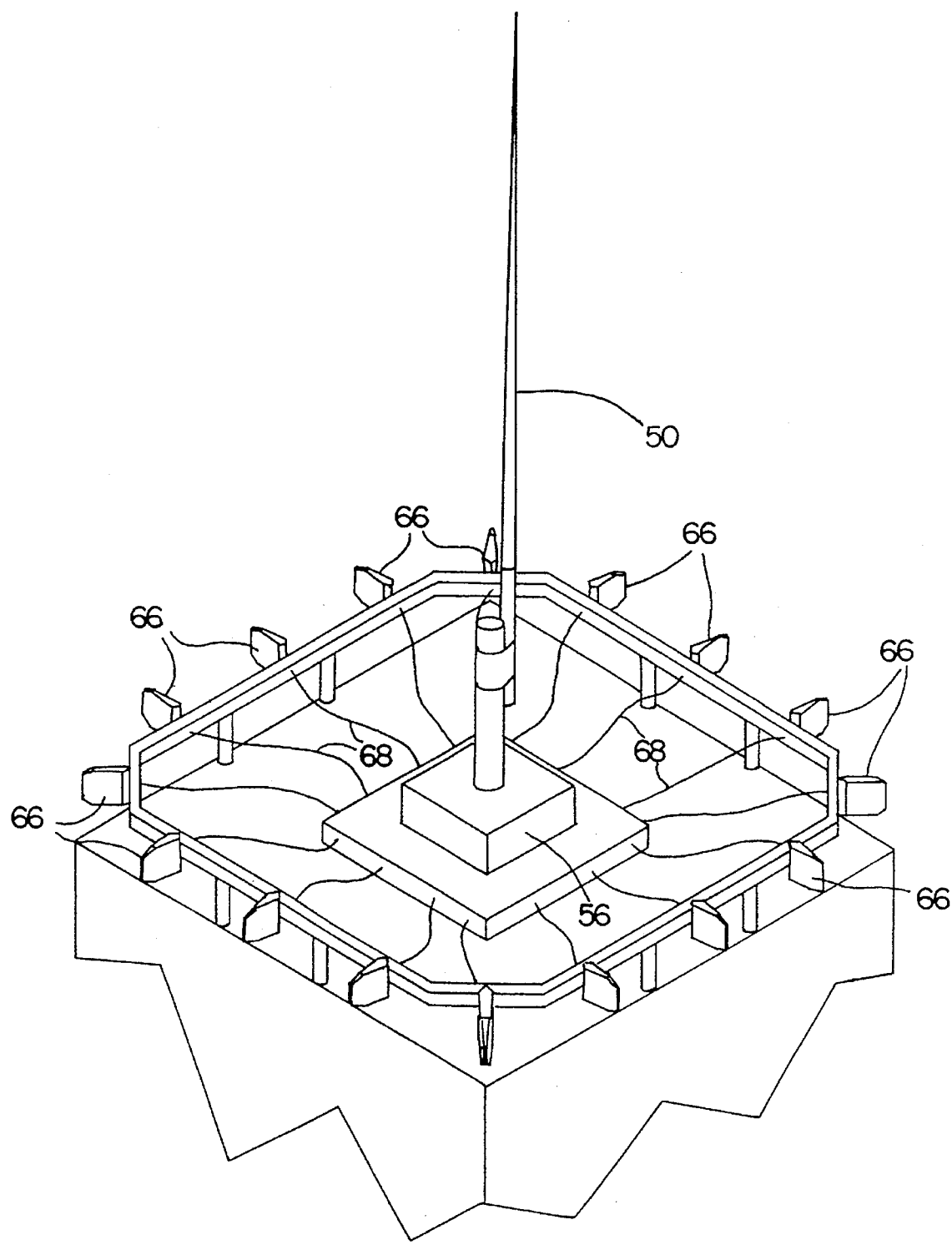
FIG. 5 is a drawing showing a preferred configuration of antennas used in the base transmitting/receiving station of the present invention.
Figure 6:
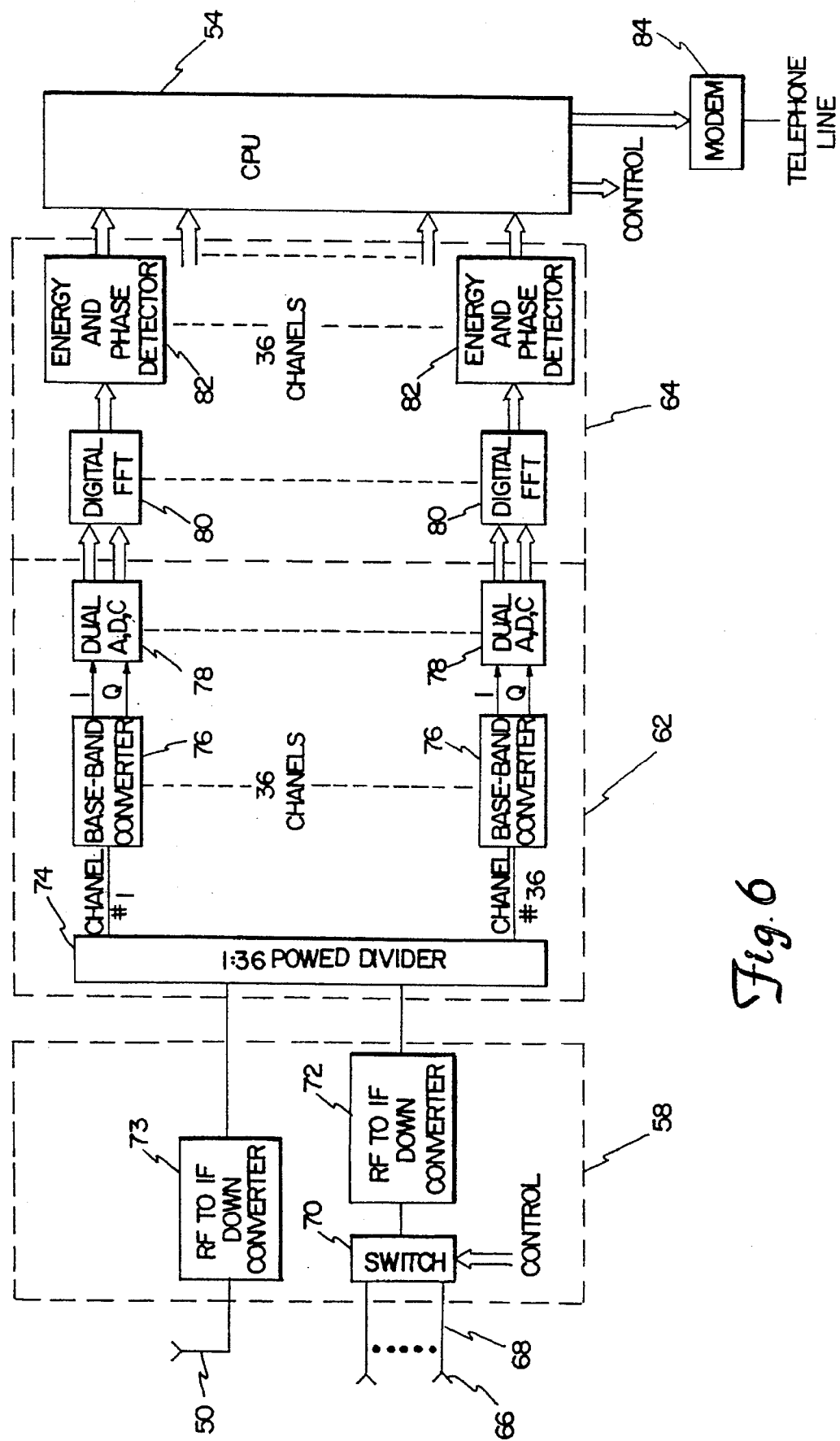
FIG. 6 is a more detailed block diagram of a portion of a preferred base receiver in accordance with a preferred embodiment of the invention.

FIGS. 4, 5 and 6 show the details of one BTR. BTR 10 includes a CPU 54 which generates timing signals for synchronizing the MTRs and which feeds these signals to a transmitter 56 for transmission to the MTRs by transmitting antenna 50. Generally, Antenna 50 is mounted together with a receiving antenna system 52 on a tower 60 or on the top of a tall building. While separate antennas are shown for receiving and transmitting, one shared antenna can be used, as is well known in the art.

In a preferred embodiment of the invention CPU 54 also activates the transmitter to transmit activation signals to one or more MTRs when activation of these units is desired from the BTR.

Antenna 52 receives signals from activated MTRs and passes these signals to RF unit 58, which down-converts the signals to IF band and passes them on IF unit 62. IF unit 62 provides base-band signals representative of the amplitude and phase of the received signals within a plurality of frequency bands. Digital Signal Processing (DSP) receiver 64 receives these signals and determines the frequency and phase of the signals received by the elements of antenna system 52. The frequency and phase information is fed into CPU 54 which then identifies the MTR and determines its direction. More detailed operation of the receiver system is described in the following paragraphs with reference to FIGS. 5 and 6.

FIG. 5 shows a typical antenna system used for transmission and direction finding. Antenna 50 which transmits the signals to the MTRs is typically a vertical dipole antenna array which radiates toward the horizon and toward the ground uniformly for all azimuthal angles. Antenna system 52 comprises a plurality of sets of three back-fire dipole antennas 66 which are not quite evenly spaced. In operation each of the antennas 66 which face in the general direction of an MTR, receive signals transmitted by the MTR with different amplitude and phase. The phase information is used to determine the precise direction of the transmitting MTR, however, there exists a phase ambiguity since antennas 66 are relatively widely spaced.. The amplitude differences are therefore used to determine the general direction of the MTR and remove this ambiguity. The spacing of antennas 66 is chosen to increase the phase sensitivity of the system without unduly increasing the ambiguity to the point where it cannot be resolved based on the amplitude differences.

The outputs of antennas are transmitted to RF unit 58 by cables 68.

The outputs of antennas 66 are fed into a SPMT switch 70 which sequentially feeds the outputs into an RF to IF down-convertor 72. An input from antenna 50 is also down-converted in down-convertor 73 and provides a reference signal for the separate signals derived from antennas 66. The output of the two down-convertors is fed into a power divider 74 which produces a plurality of, typically thirty-six, substantially identical signals which are normalized for amplitude by the signal from antenna 50. Each of these thirty-six signals is base-band converted by base-band convertors 76 to produce a different segment of the frequency range converted to base band. For example, for an overall system bandwidth of 1.5 Mhz, the segments are typically 40 Khz wide and overlap to assure continuous coverage. The outputs of the base-band convertors are typically the in-phase and quadrature components of the IF signals. These components are digitized by a dual ADC 78 and the digitized signals are fed to a Digital FFT 80, typically having 1024 points, each of which represents one channel.

Depending on the number of MTRs and other design factors, the overall bandwidth can be greater than 1.5 Mhz and the number of identical signals can be greater than thirty-six.

The individual spectra are then fed to energy and phase detectors 82 which determine the relative amplitude and phase of the signals at the individual antennas 66.

CPU 54 which receives these amplitude and phase signals also comprises a generator for generating the control signals for sequentially switching switch 70. Thus computer 54 effectively sequentially receives the amplitude and phase of all signals which are received by each of antennas 66. Based on this information a determination is made of the direction of the MTR as described above.

In the preferred embodiment of the invention in which the frequencies transmitted by the MTRs has been twiddled, the computer rejects any signals which are not associated with a "twin" at the correct frequency difference. This improves the rejection of the noise by the system and thus improves the range of detection of the MTRs. CPU 54 also includes the frequency-hopping tables for all the MTRs. Thus, when the computer receives a signal which is identified as belonging to one of the MTRs, it determines which MTRs belong to the group of MTRs which would transmit at a frequency near the received frequency. Clearly, if the frequency generator in the MTR were perfect, then the CPU could determine immediately which MTR is transmitting. However, since the accuracy of transmission of the MTRs is only about 10 kHz, the CPU waits for a number of hops to determine a pattern of transmission. With this pattern in hand and the rough values of the frequency known, the system then determines which MTR is actually transmitting and its deviation from the norm. This deviation will not change substantially over the short term and is used for the entire measurement.

Each BTR also includes a modem for transmitting information to a central station. In particular, one of the CPUs will generally act as a Central station which will send timing signals to the other stations and receive direction information regarding the transmitting MTRs from all the BTRs. The central CPU will use this information to compute the position of the radiating MTR.

Alternatively, a single mobile BTR may be used which tracks the target while it moves, thus effecting the triangulation.

In summary, a particular MTR, when activated, transmits a frequency-hopped spread-spectrum signal. The exact frequencies used by the particular MTR are stored in a memory associated with microcontroller 22 (FIG. 2) and the frequency transmitted at a particular time will depend on the identity of the MTR and on the time of transmission.

In order to overcome the inherent inaccuracies in the timing circuits of the MTRs, synchronizing signals are periodically transmitted by one of the BTRs to all of the MTRs. These timing signals reset the time base in the MTRs so that it transmits using a frequency-hopping regime which is recognized by the BTRs.

Since each MTR has its own distinctive frequency hopping "fingerprint" which is stored both microcontroller 20 of the MTRs and CPU 54 of BTRs 10; when an MTR transmits its fingerprint, the BTR translates the received signal into a frequency value. Within a small number of frequency hops, the computer is able to identify the particular MTR in spite of a frequency deviation in the transmission (or the receiver).

Alternatively or additionally, the synchronizing signals may also include a high frequency burst which is used by controller 20 to correct the base frequency generated by the MTR's base crystal oscillator. In this case the number of hops required to identify the MTR is substantially reduced, at the cost of a somewhat more complicated MTR.

Each BTR comprises antennas and circuitry which enable the CPU to determine the direction of the MTR. Direction information from a plurality of BTRs enables a central station to determine the position of the MTR.

Additional variations of the invention will occur person versed in the art. The above preferred embodiment is not exclusive but is meant to be illustrative only. The scope of the invention is defined only by the claims which follow.

We claim:

1. A spread spectrum radio location and communication system, comprising:

a base station including a base transmitter which periodically transmits a timing signal;

a plurality of mobile units each including:

a paging receiver operative to receive the timing signal transmitted by the base station;

a time base circuit for maintaining a local time base;

synchronization circuitry connected to the paging receiver and to the local time base and operable for receiving the timing signal from the paging receiver and further operable for resetting the time base; and a spread spectrum transmitter connected to the time base circuit and operable for producing a radiated spread spectrum signal synchronized to the base station; and the base station further including a plurality of antennas for receiving the spread spectrum signal and having a base receiver connected to the plurality of antennas and operable for determining the position of at least of the plurality of units by interferometric direction finding.

2. The spread spectrum radio location and communication system according to claim 1 wherein the resetting of the time base is based on the time of arrival of the timing signal received by the paging receiver.

3. The spread spectrum radio location and communication system according to claim 1 wherein the radiated spread spectrum signal of the spread spectrum transmitter is varied in a predetermined manner by twiddling the radiated spread spectrum signal.

4. The spread spectrum radio location and communication system of claim 1 wherein the plurality of antennas are irregularly spaced.

5. A method of locating one of a plurality of mobile units each having a spread spectrum radio transmitter, comprising:

providing a base station time base at a base station;

periodically transmitting a timing signal from the base station in response to the base station time base;

periodically receiving the timing signal by each of the plurality of mobile units;

correcting a local time base in each of the plurality of mobile units in response to the periodically received timing signal to synchronize the local time base to the base station time base to produce a corrected local time base; and transmitting a spread spectrum signal in synchrony to the corrected local time base;

receiving the spread spectrum signal by a plurality of receivers, each of the receivers being connected to a plurality of antennas;

determining the position of at least one of the plurality of mobile units by interferometric direction finding at each of the plurality of receivers;

determining the location of the at least one of the plurality of mobile units by triangulation; and determining the identity of the at least one of the plurality of mobile units.

\* \* \* \* \*